(12) United States Patent
Smith

(10) Patent No.: US 8,136,980 B2
(45) Date of Patent: Mar. 20, 2012

(54) METER FLOW CONDITIONER

(75) Inventor: Robert Smith, Wilmington, CA (US)

(73) Assignee: Komax Systems, Inc., Huntington Beach, CA (US)

( * ) Notice: Subject to any disclaimer, the term of this patent is extended or adjusted under 35 U.S.C. 154(b) by 1348 days.

(21) Appl. No.: 11/495,406

(22) Filed: Jul. 27, 2006

(65) Prior Publication Data

US 2008/0037366 A1    Feb. 14, 2008

(51) Int. Cl.
*B01F 5/06* (2006.01)
(52) U.S. Cl. .......................... 366/337; 366/340
(58) Field of Classification Search .............. 366/142, 366/336–341; 222/145.6, 459
See application file for complete search history.

(56) References Cited

U.S. PATENT DOCUMENTS

| | | | |
|---|---|---|---|
| 1,626,487 A * | 4/1927 | Warren .................... 366/163.2 |
| 3,286,992 A * | 11/1966 | Armeniades et al. ......... 366/339 |
| 3,923,288 A | 12/1975 | King |
| 4,034,965 A | 7/1977 | King |
| 4,068,830 A * | 1/1978 | Gray ........................ 366/175.2 |
| 4,208,136 A | 6/1980 | King |
| 4,753,535 A | 6/1988 | King |
| 5,484,203 A | 1/1996 | King |
| 5,792,371 A * | 8/1998 | Harvey et al. ................ 210/753 |
| 7,137,731 B2 * | 11/2006 | Carlson ........................ 366/337 |
| 2005/0185508 A1 * | 8/2005 | Schulz-Hanke et al. ...... 366/336 |

* cited by examiner

*Primary Examiner* — David Sorkin
(74) *Attorney, Agent, or Firm* — Bay Area Technology Law Group PC

(57) ABSTRACT

A fluid conditioner for a fluid traveling through a conduit, the conduit having a longitudinal axis and substantially circular cross-section. The fluid conditioner includes a static mixing element and a straightener plate. The preferred static mixer is one having a flat generally rectangular central portion having first and second sets of ears affixed on opposite sides of the central portion. The sets of ears include first and second ears bent respectively in upward and downward directions relative to the plane of the central portion wherein each pair of ears located diagonally opposite one another across the central portion are bent in the same direction relative to the plane of the central portion. A third set of ears extend from the central portion and terminate at a substantially rectangular member whose plane of orientation is substantially perpendicular to the central portion and a plate affixed to the substantially rectangular member and oriented substantially perpendicularly to the longitudinal axis of the conduit, the plate substantially covering the cross-section of the conduit having a plurality of openings to facilitate the passage of the fluid within the conduit.

7 Claims, 2 Drawing Sheets

METER FLOW CONDITIONER

TECHNICAL FIELD OF INVENTION

The present invention involves a fluid conditioner for use in a conduit carrying liquids or gases. The present fluid conditioner is ideally suited for use upstream of a flow meter to increase accurate flow rate readings.

The present invention relates generally to a material distribution mixing apparatus acting as a flow conditioner for fluid traveling through a conduit. The present invention has particular applicability in its employment in conjunction with a flow meter being able to improve fluid flow in a pipeline to provide a swirl-free fluid condition for a flow meter to improve accuracy.

BACKGROUND OF THE INVENTION

Fluid flow meters have been employed in a wide variety of environments and applications. In addition, a plethora of technologies have been implemented in creating appropriate flow meters for every possible fluid measurement including differential pressure flow meters including, for example, flow nozzles, orifice plates, venturi tubes and variable area rotameters. Flow nozzles are most often used in industrial applications to measure air and gas flows and are available in a number of sizes and materials. There are calorimetric flow meters which are based upon two temperature sensors that are in close contact with a fluid. There are coriolis flow meters that use the coriolis effect to measure the amount of mass that moves through an element and ultrasonic Doppler flow meters that determine if a fluid moves towards a transducer or away from it to measure the frequency differences. Turbine flow meters are strategically placed in a conduit and the fluid passing over the turbine and thus moving the turbine in angular rotation does so in response to fluid flow.

With virtually all of these technologies, it can only be as accurate as the particular flow characteristics of an incoming fluid stream. Turbulence, in its numerous forms, causes these meters to have inaccurate readings. Knowing that turbulence is induced by upstream disturbances caused by such things as pipe elbows, valves, restrictions, diameter reductions and the like suffer inaccuracy as a consequence.

Inaccuracies in fluid flow imposed by the physical environment surrounding the fluid can be adjusted by the use of a meter factor which is used to correct the unique installation creating the inaccuracy. It has been suggested that a flow straightener plate or tube bundle which segregates the internal fluid flow within a conduit to approach the meter in parallel streams would be beneficial. This method imparts a backpressure to the fluid flow which reduces its velocity profile and eliminates swirl. However, this does not totally eliminate the velocity profile. In addition, this technique requires fifteen pipe diameters of straight pipe run upstream of the correction plate and a minimum of eight diameters of straight pipe run downstream prior to the meter.

It has also been suggested to use a baffled flow straightener which temporarily increases the turbulence of the fluid and then releases the result to a pipe upstream of the meter. It has been found that this method is inconsistent at best and does not adequately prepare the flow for a uniform approach to the meter. In addition, this technique requires ten pipe diameters of straight pipe run upstream of the plate and a minimum of five diameters of straight pipe run downstream prior to the meter.

The requirement for accurate flow measurements is becoming more and more acute. For example, flow meters are employed to measure the volume of petroleum crude discharged from a tanker or alternative storage vessel. As crude prices exceeds $70 a barrel, flow meters which even have the slightest degree of inaccuracy can result in mismeasurements costing many dollars in losses.

It is thus the object of the present invention to provide a flow conditioner which can be employed upstream of a fluid flow meter to eliminate substantially the fluid's velocity profile and to segregate the flow into parallel streams, thus optimizing repeatability and minimizing the meter factor.

A further object of the present invention is to provide a flow conditioner upstream of a fluid meter requiring no pipe diameters upstream of the device to provide repeatable and accurate meter readings.

These and other objects will become more readily apparent when considering the following disclosure and dependent claims.

SUMMARY OF THE INVENTION

The present invention is directed to a fluid flow conditioner for a fluid traveling through a conduit, the conduit having a longitudinal axis and substantially circular cross-section. The fluid flow conditioner comprises a static mixing element positioned upstream of a plate that substantially covers the cross section of the conduit and is provided with plurality of openings to facilitate the passage of fluid within the conduit.

DETAILED DESCRIPTION OF THE INVENTION

Figure 1:
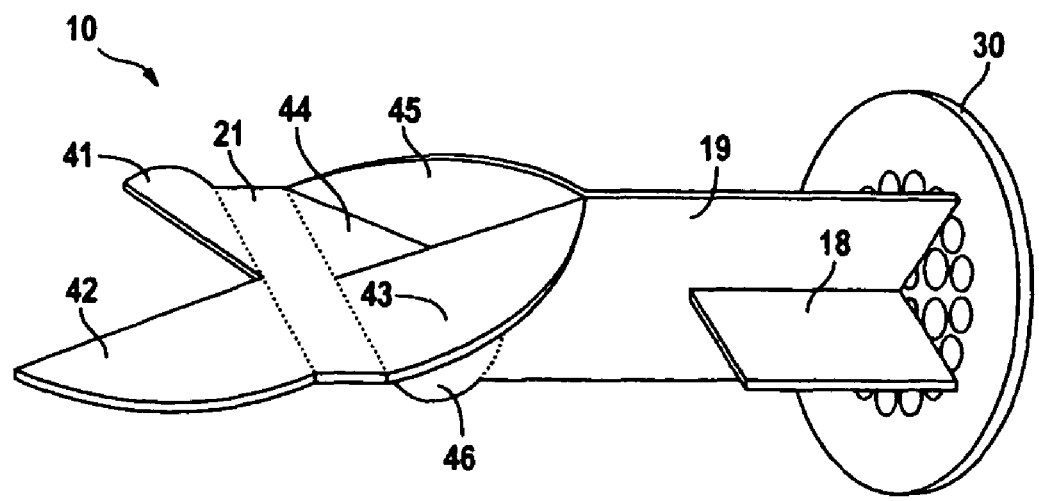
FIG. 1 is a perspective view of a flow conditioner illustrated as being a possible embodiment of the present invention.
Figure 2:
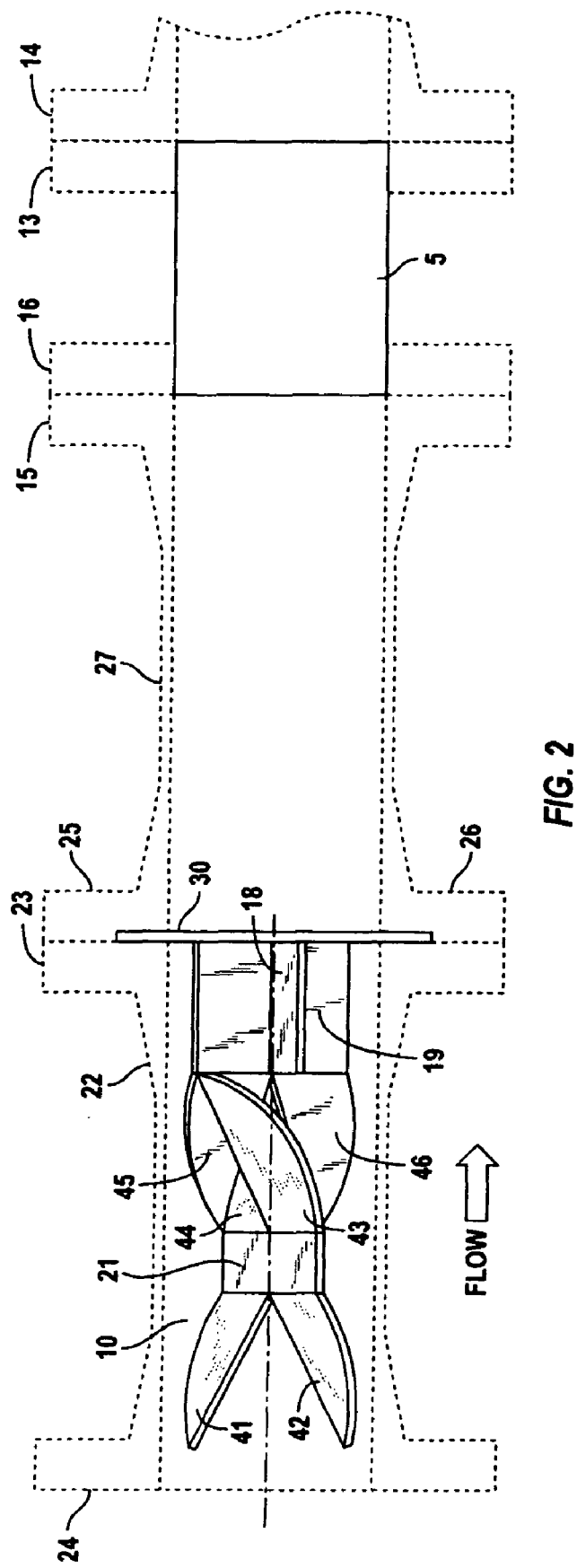
FIG. 2 is a side perspective view of the flow conditioner of FIG. 1 showing its placement within a conduit with respect to a flow meter.

The present invention is directed to a flow conditioner in the form of a static mixer and straightener plate positioned upstream of a flow meter whose accuracy is improved thereby. Any number of static mixers can be employed in the practice of the present invention. As a means of describing this invention and as disclosing its preferred embodiment, the static mixer shown in detail in FIGS. 1 and 2 is presented. Again, although the static mixer described below represents the preferred embodiment of this invention, other static mixers, such as the static mixer described in applicant's U.S. Pat. No. 3,923,288, the disclosure of which is incorporated herein by reference, can be used.

Turning first to FIGS. 1 and 2, flow conditioner 10 is depicted. Specifically, preferred flow conditioner 10 is provided with a flat generally rectangular central portion 21 and first and second sets of ears 41, 42, 43 and 44 fixed to opposite sides of central portion 21. Each pair of ears located diagonally opposite one another across central portion 21 are bent in the same direction relative to the plane of the central portion. As such, ear 41 is bent in the same direction as ear 43 and ear 42 is bent in the same direction as ear 44. To prevent what is generally referred to as "barber poling", that is, the violent rotation of fluid causing centrifuging, substantially rectangular member 19 is provided which is functionally appended to the remaining portion of flow conditioner 10 through the use of a third set of ears 45 and 46. As noted, central portion 21 is oriented substantially perpendicularly to substantially rectangular member 19. Plate 18 is further affixed to rectangular member 19, it and plate 19 being affixed to plate 17.

As noted in reference to FIG. 2, flow conditioner 10 is provided within conduit 22 having flanges 23 and 24. Corresponding flanges 25 and 26 connect pipe 22 to pipe 27 which in turn, through suitable flanges 13, 14, 15 and 16 provide fluid flow connectivity to downstream-positioned flow meter 5. Unlike the prior art, the present invention only requires zero pipe diameters upstream of flow conditioner 10 and only three pipe diameters downstream of it in positioning meter 5.

Figure 3:
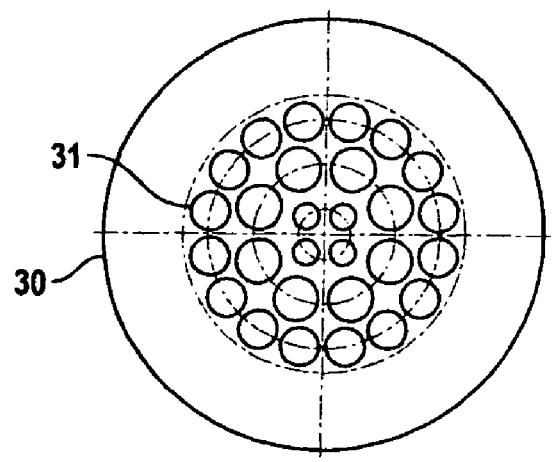
FIG. 3 is a front plan view of the flow conditioner of the present invention illustrating the plate employed as a part thereof.

Turning to FIG. 3, plate 30 is shown having a series of openings 31. When properly positioned, plate 30, being appended to and perpendicular to rectangular members 18 and 19 act as a flow straightener helping to segregate internal fluid flow into parallel streams. However, as noted above, the use of plate 30, alone, does not totally eliminate the fluid velocity profile within conduits 22 and 27. Further, the use of plate 30, alone, requires 15 pipe diameters of straight pipe run upstream of it and a minimum of 8 diameters of straight pipe run downstream. Studies have shown that the present invention provides a standard deviation meter factors across a range of flows which is reduced by 77 percent compared to using only a flow straightener plate.

The size and positioning of openings 31 within plate 30 is a matter of broad discretion. Generally, such openings vary between approximately 0.375 to 0.675 inches and, again, their size and positioning is predicated upon anticipated viscosity and volumetric flow rates passing through conduits 22 and 27.

To summarize, flow conditioner 10 completely eliminates the velocity profile as well as segregates the resulting flow traveling within the subject conduits into parallel streams, thus optimizing repeatability and minimizing the meter factor. The proposed solution requires zero pipe diameters upstream of the present device and only 3 pipe diameters downstream to the meter. This solution isolates the meter from any upstream disturbances, thus optimizing repeatability. Tests have shown the standard deviation of meter factors across a range of flows is reduced by 77 percent compared to using only the flow straightener plates of prior art.

The invention claimed is:

1. A flow conditioner for a fluid traveling through a conduit, said conduit having a longitudinal axis and substantially circular cross-section, said flow conditioner comprising a static mixing element having a flat generally rectangular central portion having first and second sets of ears affixed to opposite sides of said central portion, said sets of ears including first and second ears bent respectively in upward and downward directions relative to the plane of said central portion, each set of ears located diagonally opposite one another across said central portion being bent in the same direction relative to the plane of said central portion, a third set of ears extending from said central portion and terminating at a substantially rectangular member whose plane of orientation is substantially perpendicular to said central portion and a plate fixed to said substantially rectangular member and oriented substantially perpendicularly to said longitudinal axis, said plate substantially covering the cross-section of said conduit and having a plurality of openings to facilitate the passage of said fluid within said conduit.

2. The flow conditioner of claim 1 wherein said plate is substantially circular and substantially perpendicular to said substantially rectangular member.

3. In combination, the flow conditioner of claim 1 and a fluid flow meter, said fluid flow meter receiving and discharging fluid flowing within said conduit having been acted upon by said flow conditioner.

4. In combination, a flow conditioner for a fluid traveling through a conduit, said conduit having a longitudinal axis and substantially circular cross-section, said fluid conditioner comprising a static mixing element having a flat generally rectangular central portion having first and second sets of ears affixed to opposite sides of said central portion, said sets of ears including first and second ears bent respectively in upward and downward directions relative to the plane of said central portion, each set of ears located diagonally opposite one another across its central portion being bent in the same direction relative to the plane of said central portion, a third set of ears extending from said central portion and terminating at a substantially rectangular member whose plane of orientation is substantially perpendicular to said central portion, a plate affixed to said substantially rectangular member and oriented substantially perpendicularly to said longitudinal axis, said plate substantially covering the cross-section of said conduit and having a plurality of openings to facilitate the passage of said fluid within said conduit and a fluid flow meter located so as to receive fluid from said conduit downstream of said flow conditioner and for discharging said fluid therefrom.

5. The combination of claim 4 wherein said flow meter is positioned at least three pipe diameters downstream from said flow conditioner.

6. A method of minimizing fluid velocity profiles of fluid traveling within a conduit, said method comprising positioning within a conduit having a longitudinal axis and substantially circular cross-section, a flow conditioner, said flow conditioner comprising a static mixing element having a flat generally rectangular central portion having first and second sets of ears affixed to opposite sides of said central portion, said sets of ears including first and second ears bent respectively in upward and downward directions relative to the plane of said central portion, each set of ears located diagonally opposite one another across its central portion being bent in the same direction relative to the plane of said central portion, a third set of ears extending from said central portion and terminating at a substantially rectangular member whose plane of orientation is substantially perpendicular to said central portion and a plate affixed to said substantially rectangular member and oriented substantially perpendicularly to said longitudinal axis, said plate substantially covering the cross-section of said conduit and having a plurality of openings to facilitate the passage of fluid within said conduit, said method further comprising passing a fluid within said conduit, said fluid being acted upon by said flow conditioner.

7. The method of claim 6 wherein a fluid flow meter is further positioned to receive and discharge fluid flowing within said conduit having been acted upon by said flow conditioner and passing said fluid within said conduit past said flow conditioner and flow meter for measuring the quantity of fluid passing therethrough.

* * * * *